United States Patent [19]

Pronk et al.

[11] Patent Number: 4,590,087
[45] Date of Patent: May 20, 1986

[54] FAT HAVING BUTTER-LIKE PROPERTIES AND A REDUCED TENDENCY TO DEVELOP GRAININESS AND PROCESS FOR PRODUCING SUCH

[75] Inventors: Jacobus N. Pronk, Vlaardingen, Netherlands; Martin Soltau; Theophil Wieske, both of Hamburg, Fed. Rep. of Germany

[73] Assignee: Lever Brothers Company, New York, N.Y.

[21] Appl. No.: 574,498

[22] Filed: Jan. 27, 1984

[30] Foreign Application Priority Data

Jan. 31, 1983 [GB] United Kingdom ................ 8302574
Jan. 31, 1983 [GB] United Kingdom ................ 8302575
Feb. 4, 1983 [GB] United Kingdom ................ 8303099

[51] Int. Cl.$^4$ ............................ A23D 3/00; A23D 5/02
[52] U.S. Cl. ..................................... 426/603; 426/606; 426/607
[58] Field of Search ................ 426/603, 604, 606, 607

[56] References Cited

U.S. PATENT DOCUMENTS

| 3,600,195 | 8/1971 | Westenberg ........................ 426/607 |
| 3,607,305 | 9/1971 | Westenberg .................... 426/607 X |
| 3,949,105 | 4/1976 | Wieske et al. ...................... 426/607 |
| 4,016,302 | 4/1977 | Kattenberg et al. ................ 426/607 |
| 4,087,564 | 5/1978 | Poot et al. ...................... 426/607 X |
| 4,230,737 | 10/1980 | Heider et al. ...................... 426/607 |

FOREIGN PATENT DOCUMENTS

| 639743 | 7/1950 | United Kingdom . |
| 650481 | 2/1951 | United Kingdom . |
| 765870 | 1/1957 | United Kingdom . |
| 1215868 | 12/1970 | United Kingdom . |

OTHER PUBLICATIONS

Davis, "The Rheology of Cheese, Butter and Other Milk Products," J. Dairy Research, 8, 1937, pp. 245-264.

A. J. C. Andersen and P. N. Williams, "Margarine", Pergamon Press 1965, pp. 246 et seq.

*Primary Examiner*—Robert Yoncoskie
*Attorney, Agent, or Firm*—James J. Farrell

[57] ABSTRACT

Development of excessive graininess in fats (i) which are prone to graininess can be reduced by incorporating therein a fat (ii) consisting of triglycerides from unsaturated fatty acids in the trans-configuration.

Margarine fats with butter-like properties and displaying a reduced tendency to graininess are produced e.g. by interesterification of a fat rich in palmitic acid residues, particularly palm oil or fractions thereof, with triglycerides from $C_{18}$–$C_{24}$ unsaturated fatty acids in the trans-configuration.

11 Claims, No Drawings

FAT HAVING BUTTER-LIKE PROPERTIES AND A REDUCED TENDENCY TO DEVELOP GRAININESS AND PROCESS FOR PRODUCING SUCH

The present invention relates to a fat suitable for the preparation of shortenings and emulsions such as margarines or low-calorie spreads and to a process for the preparation thereof.

The present invention relates particularly to a fat having butter-like properties and a reduced tendency to graininess.

By butter-like properties is understood in this specification a plasticity and elasticity which substantially correspond to those of natural butter. These properties and their measurement are described in J. Dairy Research 8, 245 (1937), Davies, J. C.; The British Food Manufacturing Ind. Res. Ass., The Rheology of Margarine and Compound Cooking Fats, part I (Res. Rep. 37) and part II (Res. Rep. 69), 1956, Prentice, J. H. The plasticity of a fat can e.g. be evaluated by slowly inserting a rod of 7 mm diameter into a fat having a C-value of approximately 1000 g/cm$^2$ and measuring the degree of collar formation. The fat can also be assessed on resemblance to butter by a skilled panel with respect to organoleptic properties, visual appearance and spreadability.

By graininess is understood in this specification the development of triglyceride conglomerates having a melting point which can be as high as 25° C. and dimensions exceeding about 30 microns. These triglyceride conglomerates consist mainly of mixed crystals of triglycerides which may comprise any of the following combinations: POP/PPO; PPO/OPO; POS/OPO; POS/OSO; POP/OSO; SOS/OPO; MOS/OPO; SOS/OSS; POP/SPO; SOS/PSO; MPM/PMP; MSM/SMS; $C_{10}MM/MC_{10}M$; PPP/OPO; PPP/PPO; PPP/POP, in which P stands for palmitic acid, O stands for oleic acid, S stands for stearic acid and M stands for myristic acid.

Applicants have found that a butter-like fat blend with a reduced tendency to graininess can be produced by mixing a fat (i) which is prone to graininess with an effective amount of a graininess-inhibiting fat (ii) containing unsaturated fatty acid residues in the trans configuration at a level preferably ranging from 30 to 70 wt.% (determined according to AOCS Tentative Method CD 14-6).

Fats (i) which are prone to graininess generally consist of triglycerides satisfying the following requirements:

(a) $0.2 \leq PUP:PPU \leq 1.6$; wherein
PUP is the concentration in mol% of symmetric triglycerides from 2 palmitic acid residues and 1 oleic acid- or linoleic acid-residue in the cis-configuration;
PPU is the concentration in mol% of asymmetric triglycerides from 2 palmitic acid residues and 1 oleic acid or linoleic acid-residue in the cis-configuration;
(b) $Sa_3 \leq (PUP + PPU) - 7$, wherein
Sa stands for a saturated $C_{16-24}$-fatty acid,
U stands for an oleic acid- or linoleic acid-residue in the cis-configuration; and
$Sa_3$ stands for the concentration in mol% of triglycerides from 3 saturated $C_{16-24}$-fatty acid residues and PUP and PPU have the same meaning as above.

Fats (i) displaying graininess may result from randomly interesterifying a fat (iii) rich in palmitic acid residues as defined further in the specification with triglycerides having unsaturated $C_{18-24}$ fatty acids substantially free from trans-fatty acids or having a low to moderate level of trans-fatty acids (e.g. less than about 30 wt.% of the unsaturated fatty acids are in the trans-configuration).

It is also possible to use mixtures of randomly interesterified and non-interesterified fat (i) for adjusting the ratio of PUP/PPU-triglycerides.

The graininess-inhibiting fat (ii) is a fat obtained by hydrogenation of a liquid oil such as soybean-, sunflower-, safflower-, groundnut-, rapeseed-, rice-, wheatgerm-, olive-, maize-oil or mixtures of said oils to a melting point ranging from 26° to 34° C. under conditions conducive to a level of unsaturated fatty acid residues in the trans configuration ranging from 30 to 70 wt.% (e.g. using a sulphur-poisoned nickel catalyst) and preferably to a level of trans fatty acids ranging from 45 to 67 wt.%.

An effective proportion of fat (ii) will in most instances correspond to a ratio of fat (ii) to fat (i) ranging from 0.01 to 0.2.

The fat blends according to the invention are preferably produced from 70–99 wt.% of fat (i), 1–19 wt.% of the graininess-inhibiting fat (ii) and 0–20 wt.% of a non-hydrogenated vegetable liquid oil, containing at least 20 wt.%, preferably 40 wt.% or more of linoleic acid, the sum of the concentrations of the various components being 100%.

Said liquid oil is used to adjust the consistency and the mouth feel and increase the level of essential fatty acids of the final product.

A process for producing a butter-like fat having a reduced tendency to develop graininess, according to the invention, may comprise randomly interesterifying a fat (i) as hereinbefore defined, which is prone to graininess, with an effective amount of a graininess-inhibiting fat (ii) containing triglycerides from unsaturated fatty acids 30–70 wt.% of which are in the trans-configuration.

A preferred butter-like fat having a reduced tendency to develop graininess according to the invention is produced by randomly interesterifying a fat (iii) in which at least 20 wt.% of the fatty acid residues consist of palmitic acid with a fat (ii) in which at least 60 wt.% of the fatty acid residues have a chain length of 18–24 carbon atoms and 30–70 wt.% of the fatty acid residues are in the trans configuration.

The mixture to be interesterified preferably comprises a fat (iii) selected from the group consisting of palm-, cottonseed-, cocoabutter-, lard-, tallow-, menhaden-, butter-fat and fractions of these fats in hydrogenated or non-hydrogenated form and another fat selected from the group consisting of soybean-, sunflower-, groundnut-, rapeseed-, rice-, wheatgerm-, olive-, cottonseed- and maize-oil, hydrogenated under trans-promoting conditions to a melting prointranging from 26° to 37° C., preferably from 28° to 34° C. In this mixture the first (palmitic) fat is present in a proportion preferably ranging from 50 to 90 wt.% and the trans-fat is present in a proportion ranging from 10 to 50 wt.%.

According to a preferred embodiment of the process of the present invention the interesterified mixture is fractionated under conditions conducive to a high melting fraction enriched in triglycerides from 3 saturated fatty acids with a chain length of 16 to 24 carbon atoms and a lower melting olein fraction containing less than 7 wt.% of said triglycerides from 3 saturated fatty acids.

It is of course also possible to subject the whole fat blend consisting of interesterified and non-interesterified components to fractionation in order to remove said high-melting triglycerides from 3 saturated fatty acids.

Random interesterification can be carried out using classical catalysts such as alkali metals, their hydroxides or alkoxides, applying substantially moisture-free conditions, a reduced pressure (e.g. 2 mm Hg) and relatively high temperatures (e.g. 90°–110° C.).

The fractionation step can be carried out by applying various methods known per se, e.g. by dry fractionation (in the absence of a solvent), by wet fractionation (in the presence of an organic solvent) or by fractionation involving the use of an aqueous solution of a surface-active agent.

Preferably fractionation and separation of the various fractions takes place at a temperature ranging from 28° to 38° C., preferably from 30° to 36° C., in the absence of a solvent.

The fractionation can be carried out by first heating the fat to 45°–65° C., then cooling the fat while stirring to preferably 30°–36° C., at which temperature the fat is kept for a few hours, whereafter separation of the higher- from the lower-melting olein fraction is carried out.

It is useful for the fractionation to be conducted under conditions such that the level of triglycerides from 3 saturated fatty acids in the lower melting olein fraction ranges from 0 to 7 wt.% and preferably from 0 to 4 wt.%.

The olein obtained can be used as the sole or the main component of the butter-like fat blends or the butter-like emulsions, respectively, according to the invention.

The fat blends according to the present invention are characterized by the following fatty acids composition:
palmitic acid: 16–46 wt.%;
stearic acid: 4–12 wt.%;
unsaturated $C_{16}$–$C_{24}$ fatty acids in the transconfiguration: 5–35 wt.%, preferably 7–25 wt.%;
saturated $C_8$–$C_{14}$ fatty acids: 0–15 wt.%, preferably 0–10 wt.%.

The remainder of the fatty acids substantially consists of all-cis unsaturated $C_{16}$–$C_{24}$ fatty acids, the sum of the fatty acids being 100%.

The fat blends according to the present invention are also characterized by the presence of
5–15 mol% of PUP as hereinbefore defined;
5–15 mol% of PPU as hereinbefore defined,
with the proviso that the PUP/PPU ratio ranges from 0.2 to 1.6;
0–5 mol% of triglycerides from 3 saturated $C_8$–$C_{24}$ fatty acids;
5–20 mol% of triglycerides from 1 $C_{16}$–$C_{24}$ saturated fatty acid, 1 mono- or di-unsaturated $C_{18}$ trans-fatty acid and 1 oleic or linoleic acid;
10–25 mol% of triglycerides from 1 $C_{16}$–$C_{24}$ saturated fatty acid and 2 identical or different fatty acids consisting of linoleic or oleic acid;
2–10 mol% of triglycerides from 2 $C_{16}$–$C_{24}$ saturated fatty acids and 1 $C_{18}$-trans fatty acid and triglycerides from 1 $C_{16}$–$C_{24}$ saturated fatty acid and 2 $C_{18}$-trans fatty acids.

Water-in-oil emulsion spreads, particularly margarines, with a reduced tendency to graininess development and butter-like properties, can be produced by emulsifying a fat blend according to the invention and obtainable according to a process as hereinbefore described, with an aqueous phase and subjecting the emulsion obtained to cooling and texturizing treatments to obtain a plastic spread. The aqueous phase can contain additives which are customary for margarine, for example emulsifying agents, salts and flavours. Oil-soluble additives, e.g. flavouring compounds, vitamins etc., can be included in the fatty phase. Generally the proportion of fatty phase in a margarine varies from about 75 to 85 wt.% of the emulsion, depending on local statutory requirements for margarine. Alternatively higher proportions of the aqueous phase can be adopted in the production of low-fat spreads, which can contain as little as 35% by weight of fat.

The emulsions, particularly margarines, can be manufactured in a conventional closed tubular surface-scraped exchanger as described in "Margarine" by A. J. C. Andersen and P. N. Williams, Pergamon Press 1965, pp. 246 et seq. Votator arrangements described in British patent specification Nos. 639 743, 650 481 and 765 870 are particularly suitable. Alternatively, emulsions can be prepared by means of a phase inversion process as described in British Patent Specification No. 1 215 868 or on conventional cooling drums in the same book by Andersen and Williams.

In order to achieve the consistency of natural butter, the fat blend according to the invention preferably has the following fat solids profile (measured as NMR-values, according to J.A.O.C.S. 1971 (48), p. 7, A. J. Haighton et al.):
$N_{10}$=40–60
$N_{20}$=15–30
$N_{30}$=0–7.

The invention will now be illustrated in the following Examples and Tables A, B and C.

EXAMPLE I

A mixture of 74 wt.% of palm oil, 21 wt.% of soybean oil hydrogenated to a melting point of 36° C., using freshly precipitated Ni-catalyst and 5 wt.% of groundnut oil hydrogenated to a melting point of 31° C. using a sulphur-poisoned nickel catalyst, containing less than 0.01 wt.% of water, was randomly interesterified at 90° C. in a stirred vessel which was held under a vacuum of 2 mm Hg, in the presence of 0.1% of sodium methoxide. After 20 min the mixture was cooled and the vacuum released. The catalyst was destroyed by washing the mixture with water and the fat was then dried.

Fractionation of the interesterified mixture was carried out in the absence of a solvent by first heating the fat to about 55° C. and then cooling it to 32° C., the temperature at which separation of the lower-melting liquid olefin fraction from the higher-melting fraction was carried out.

Margarines were produced from 84 wt.% olefin and 16 wt.% aqueous phase and assessed. The graininess and plasticity scores are given in Table A.

EXAMPLE II

Example I was repeated, this time, however, starting from a mixture of 70 wt.% of palm oil and 30% of soybean oil hydrogenated to a melting point of 36° C., using a sulphur-poisoned nickel catalyst.

Margarines were produced from 84 wt.% olein and 16 wt.% aqueous phase and assessed. The graininess and plasticity scores are given in Table A.

COMPARATIVE EXAMPLE I

Example I was repeated, except that hydrogenation of both the soybean- and groundnut-oil was carried out with a freshly precipitated nickel catalyst under conditions conducive to a level of trans-fatty acids in the total fat product below 5 wt.%. Margarines were produced from 84 wt.% olein and 16 wt.% aqueous phase.

The plasticity score attributed to the margarines was 4. The graininess score attributed to these margarines was 5, after a period of storage of 6 weeks at 15° C.

COMPARATIVE EXAMPLE II

Example II was repeated except that hydrogenation of the soybean oil was carried out with a freshly precipitated nickel catalyst under conditions conducive to a level of trans-fatty acids in the total fat product below 5 wt.%. Margarines were produced from 84 wt.% olein and 16 wt.% aqueous phase.

The plasticity score attributed to these margarines was 4 and the graininess score attributed to these margarines was 5, after a period of storage of 6 weeks at 15° C.

EXAMPLE III

A mixture of 78 wt.% of palm oil and 22 wt.% of soybean oil hydrogenated with a freshly precipitated Ni-catalyst to a melting point of 36° C., containing less than 0.01 wt.% of water, was randomly interesterified at 90° C. in a stirred vessel which was held under a vacuum of 2 mm Hg, in the presence of 0.1 wt.% of sodium methoxide. After 20 min the mixture was cooled and the vacuum released. The catalyst was destroyed by washing the mixture with water and the fat was subsequently dried.

Fractionation of the interesterified mixture was carried out in the absence of a solvent by first heating the fat to about 55° C. and then cooling it to 32° C., the temperature at which separation of the lower-melting liquid olein fraction from the higher-melting fraction was carried out.

A fat blend was prepared consisting of 90 wt.% of the lower-melting (olein) fraction and 10 wt.% of high-trans groundnut oil hydrogenated to a melting point of 31° C., using 0.2 wt.% of a sulphur-poisoned nickel catalyst at 180° C. to achieve a level of trans fatty acids of 55 wt.% (AOCS Tentative Method Cd 14–61).

EXAMPLE IV

The procedure of Example III was repeated, starting from a mixture of 78 wt.% of palm oil and 22 wt.% of soybean oil hydrogenated to an m.p. of 36° C.

Fractionation was carried out at 34° C.

A fat blend was produced from 90 wt.% of the lower-melting (olein) fraction and 10 wt.% of high trans-groundnut oil hydrogenated to m.p.=31° C.

EXAMPLE V

The procedure of Example III was repeated, starting from a mixture of 78 wt.% of palm oil and 22 wt.% of soybean oil hydrogenated to a melting point of 36° C.

Fractionation was carried out at 34° C.

A fat blend was produced from 85 wt.% of the lower-melting (olein) fraction and 15 wt.% of high-trans rapeseed oil (m.p.=30° C.).

EXAMPLE VI

The procedure of Example I was repeated, starting from a mixture of 78 wt.% of palm oil and 22 wt.% of soybean oil hydrogenated to a melting point of 36° C.

Fractionation was carried out at 34° C.

A fat blend was produced from 85 wt.% of the lower-melting (olein) fraction and 15 wt.% of soybean oil hydrogenated to a melting point of 32° C.

Margarines were produced starting from the various fat blends obtained in Examples III–VI. The assessment of the graininess and plasticity of the various margarines is given in Table B.

EXAMPLE VII

The procedure of Example III was repeated starting from a mixture of 78 wt.% of palm oil and 22 wt.% of soybean oil hydrogenated with a freshly precipitated Ni-catalyst, to a melting point of 36° C.

A fat blend was produced from 82 wt.% of the lower-melting (olein) fraction, 10 wt.% of high-trans groundnut oil hydrogenated to a melting point of 31° C. and 8 wt.% of non-hydrogenated sunflower oil.

The $Sa_3$-content of the olein fraction obtained at a fractionation temperature of 32° C. was 3.5 mol%. The trans-content of the high-trans groundnut oil (inhibitor) was 55 wt.%.

The fat solids profile of the fat blend expressed in NMR values was:
$N_{10}=42.5$;
$N_{20}=16.5$;
$N_{30}=2,9$;
$N_{35}=0.1$.

The graininess score of margarines produced from said fat blend, at 15° C. (after 6 weeks' storage) was 2 and the plasticity score was 3.7.

The fatty acid composition and the triglyceride composition of the fat blend are given in Table C.

EXAMPLE VIII

A mixture of 70 wt.% of palm oil and 30 wt.% of soybean oil hydrogenated under trans-promoting conditions was randomly interesterified as described in Example I. The interesterified mixture was fractionated at 32° C. in a high-melting stearin and a low-melting olein. 92 wt.% of said olein were mixed with 8 wt.% of non-hydrogenated sunflower oil to obtain a margarine fat blend.

The fatty acid composition and the triglyceride composition are given in Table C.

The graininess score of margarines produced from the fat blend, at 15° C. (after 6 weeks' storage) was 2.5 and the plasticity score was 3.5.

TABLE A

| Example | I | II |
|---|---|---|
| Olein: | | |
| $Sa_3$-content (mol %) | 3.5 | 3.5 |
| Fract. temp. (°C.) | 32 | 32 |
| Graininess inhibitor | hardened groundnut oil | hardened soybean oil |
| Melting point (°C.) | 31 | 36 |
| Trans-content (wt. %) | 55 | 65 |
| Product: | | |
| $C_{16}$-content | 26.5 | 28.1 |
| U-content | 62.9 | 63.3 |
| $C_{12}$–$C_{14}$-cont. | 3.0 | 1. |
| $C_{18}$-content | 7.6 | 7.6 |
| NMR-value (Fat solids profile) | | |

TABLE A-continued

| Example | I | II |
|---|---|---|
| $N_{10}$ | 48.9 | 50.3 |
| $N_{20}$ | 20.1 | 20.2 |
| $N_{30}$ | 2.9 | 2.8 |
| $N_{35}$ | 0 | 0 |
| Graininess at 15° C. (after 6 weeks' storage) | 2 | 2 |
| Panel assessment of plasticity | 4.0 | 4.0 |

Graininess Score: (after a period of storage of max. 6 weeks at 15° C.)
5 = very high graininess development
4 = high graininess development
3 = acceptable graininess development
2 = hardly perceivable graininess dev.
1 = very little or no graininess dev.
Plasticity Score:
5 = identical with natural
4 = almost identical with butter
3 = good plasticity
2 = below average
1 = bad plasticity

TABLE B

| Example | III | IV | V | VI |
|---|---|---|---|---|
| Olein: | | | | |
| $Sa_3$-content (mol %) | 3.5 | 4.5 | 4.5 | 4.5 |
| Fract. temp. (°C.) | 32 | 34 | 34 | 34 |
| Graininess inhibitor | ground-nut oil mp = 31° C. | ground-nut oil mp = 31° C. | rape-seed oil mp = 30° C. | soybean oil mp = 32° C. |
| Trans-content (wt. %) | 55 | 58 | 67 | 64 |
| Product: | | | | |
| $C_{16}$-content (wt. %) | 26.9 | 31.0 | 30.5 | 31.0 |
| U-content (wt. %) | 62.5 | 61.8 | 62.0 | 61.7 |
| $C_{12}$–$C_{14}$-cont. (wt. %) | 1.9 | 0.9 | 0.9 | 0.9 |
| $C_{18}$-content (wt. %) | | | | |
| NMR-values* | | | | |
| $N_{10}$ | 50.3 | 52.2 | 51.8 | 54.2 |
| $N_{20}$ | 19.8 | 21.6 | 21.7 | 23.7 |
| $N_{30}$ | 2.9 | 3.0 | 3.6 | 5.2 |
| $N_{35}$ | 0 | 0 | 0.1 | 0.2 |
| Graininess at 15° C. (after 6 weeks' storage) | 1.5 | 1 | 2.5 | 2.5 |
| Panel assessment of plasticity | 4.0 | 4 | 4 | 3.6 |

*Fat Solids Profile
Graininess Score:
5 = very high graininess development
4 = high graininess development
3 = acceptable graininess development
2 = hardly perceivable graininess dev.
1 = very little or no graininess dev.
Plasticity Score:
5 = identical with natural butter
4 = almost identical with natural butter
3 = good plasticity
2 = below average
1 = bad plasticity

TABLE C

| | Ex. VII | Ex. VIII |
|---|---|---|
| Fatty acids | wt. % | wt. % |
| $C_{12}$ | 0.6 | 0.2 |
| $C_{14}$ | 1.0 | 0.8 |
| $C_{16}$ | 28.8 | 28.8 |
| $C_{16:1}$ | 0.2 | 0.3 |
| $C_{18}$ | 5.3 | 5.4 |
| $C_{18:1}$ | 46.8 | 48.3 |
| $C_{18:2}$ | 15.9 | 15.5 |
| $C_{18:3}$ | 0.3 | 0.2 |
| $C_{20}$ | 0.4 | 0.3 |
| $C_{20:1}$ | 0.2 | 0.2 |
| $C_{22}$ | 0.5 | — |
| Triglycerides | (mol %) | (mol %) |
| PUP | 4.0 | 6.6 |
| PPU | 7.4 | 7.1 |
| $H_3$ | 2.3 | 2.2 |
| HEU/EH U/EUH | 11.2 | 8.5 |

TABLE C-continued

| | Ex. VII | Ex. VIII |
|---|---|---|
| $HU_2$ | 14.8 | 14.2 |
| $H_2E/HE_2$ | 8.3 | 10.0 |

P = palmitic acid
U = oleic or linoleic acid (cis-configuration)
H = $C_8$–$C_{24}$ saturated fatty acid
E = elaidic acid

We claim:

1. A butter-like fat having a reduced tendency to develop graininess, which comprises:
   from 16 to 46 wt.% palmitic acid residues;
   from 4 to 12 wt.% stearic acid residues;
   from 5 to 35 wt.% unsaturated $C_{16}$–$C_{24}$ fatty acid residues in the trans configuration;
the remainder of the fatty acid residues being unsaturated $C_{16}$–$C_{24}$ fatty acid residues, wherein said fat comprises:
   5–15 mol.% of PUP;
   5–15 mol.% of PPU;
   5–20 mol.% of triglycerides from 1 saturated $C_{16}$–$C_{24}$ fatty acid, 1 mono- or di-unsaturated $C_{18}$ trans-fatty acid and 1 oleic or linoleic acid;
   10–25 mol.% of triglycerides from 1 saturated $C_{16}C_{24}$ fatty acid and 2 identical or different fatty acids consisting essentially of linoleic acid or oleic acid;
   2–10 mol.% of triglycerides from 2 $C_{16}$–$C_{24}$ saturated fatty acids and 1 $C_{18}$-trans fatty acid and triglycerides from 1 $C_{16}$–$C_{24}$ saturated fatty acids and 2 $C_{18}$-trans fatty acids;
wherein PUP is a symmetric triglyceride from 2 palmit acid residues and 1 oleic acid or linoleic acid residue in cis-configuration, PPU is an asymmetric triglyceride from 2 palmitic acid residues and 1 oleic acid or linoleic acid residue in the cis-configuration, and the ratio PUP/PPU is from 0.2 to 1.6.

2. A process for producing a butter like fat as defined in claim 1 having a reduced tendency to develop graininess, comprising:
(i) forming a mixture of triglycerides which are prone to graininess wherein the triglycerides satisfy the requirements of:
   (a) $0.2 \leq PUP:PPU \leq 1.6$, wherein PUP is the concentration in mol% of symmetric triglycerides from 2 palmitic acid residues and 1 oleic acid- or linoleic acid-residue in the cis-configuration, and
   (b) $Sa_3 \leq (PUP+PPU)-7$, wherein Sa is a saturated $C_{16-24}$-fatty acid, U is an oleic acid- or linoleic acid-residue in the cis-configuration, and $Sa_3$ is the concentration in mol% of triglycerides from 3 saturated $C_{16-24}$-fatty acid residues, and PUP and PPU have the same meaning as set forth in (a) above, and
(ii) interesterifying said mixture of triglycerides with 1–19% of a graininess inhibiting hydrogenated fat having from 30 to 70% by weight unsaturated fatty acid residues in the trans configuration to form an interesterified mixture;
wherein the ratio of said graininess inhibiting hydrogenated fat to said mixture of triglycerides is from 0.01 to 0.2.

3. A process according to claim 2, wherein said graininess inhibiting hydrogenated fat has from 45 to 67 wt.% unsaturated fatty acid residues in the trans configuration.

4. A process according to claim 2 wherein said graininess inhibiting hydrogenated fat has a melting point of from 26–34 degrees centigrade.

5. A process according to claim 2 wherein said butter-like fat comprises 70–99% by weight of said mixture of triglycerides prone to graininess, 1–19% by weight of said graininess inhibiting hydrogenated fat, the balance comprising an oil which is substantially free from fat solids at 10 degrees centigrade having at least 20 wt.% of linoleic acid residues.

6. A process according to claim 2 wherein said mixture of triglycerides prone to graininess and said graininess inhibiting hydrogenated fat are randomly interesterified.

7. A process according to claim 6 further comprising fractionating said interesterified mixture to remove a high melting fraction enriched in triglycerides from 3 saturated fatty acids with a chain length of 16 to 24 carbon atoms from the lower melting olein butter-like fat fraction containing less than 7% of said triglycerides from 3 saturated fatty acids.

8. A process according to claim 7, in which said fractionating step is carried out in the absence of solvent at a temperature from 28 to 38 degrees centigrade.

9. A process for producing a butter-like water-in-oil emulsion spread with a reduced tendency to develop graininess, which comprises emulsifying a butter-like fat as defined in claim 1 in an aqueous phase and cooling and texturizing the resulting emulsion to obtain a plastic water-in-oil emulsion spread.

10. A water-in-oil emulsion spread comprising a fat according to claim 1.

11. A water-in-oil emulsion spread comprising a fat prepared according to claim 2.

* * * * *